United States Patent [19]

Sasaki et al.

[11] Patent Number: 5,470,900
[45] Date of Patent: Nov. 28, 1995

[54] POWDER MOLDING PROCESS USING A THERMOPLASTIC ELASTOMER POWDER

[75] Inventors: Toshio Sasaki; Takeshi Ebara, both of Ichihara; Toshio Igarashi, Kyoto; Masayuki Tatsumi, Ibaraki; Kazuki Wakamatsu, Sodegaura, all of Japan

[73] Assignee: Sumitomo Chemical Company, Limited, Osaka, Japan

[21] Appl. No.: 245,829

[22] Filed: May 19, 1994

Related U.S. Application Data

[63] Continuation-in-part of Ser. No. 38,947, Mar. 29, 1993, abandoned.

[30] Foreign Application Priority Data

Apr. 3, 1992 [JP] Japan .................... 4-081990

[51] Int. Cl.$^6$ .................... C08F 297/08; C08L 23/16; C08L 53/00
[52] U.S. Cl. .................... 524/269; 524/261; 525/88; 525/240; 525/323; 525/247
[58] Field of Search .................... 525/323, 88, 240, 525/247; 524/261, 269

[56] References Cited

U.S. PATENT DOCUMENTS

| | | | |
|---|---|---|---|
| 4,576,994 | 3/1986 | Dorrer et al. | |
| 4,739,015 | 4/1988 | Toyota et al. | 525/323 |
| 4,820,775 | 4/1989 | Shiga et al. | 525/323 |
| 4,900,706 | 2/1990 | Sasaki et al. | 526/119 |
| 4,978,722 | 12/1990 | Goko et al. | 525/323 |
| 5,162,442 | 11/1992 | Matsuura et al. | 525/323 |
| 5,210,139 | 5/1993 | Huff | 525/240 |
| 5,258,464 | 11/1993 | McCullough et al. | 525/240 |
| 5,262,487 | 11/1993 | Fujita et al. | 525/323 |
| 5,308,699 | 5/1994 | Hikasa et al. | 525/240 |
| 5,308,700 | 5/1994 | Hikasa et al. | 525/240 |

FOREIGN PATENT DOCUMENTS

| | | |
|---|---|---|
| 0135834 | 4/1985 | European Pat. Off. . |
| 0373660 | 6/1990 | European Pat. Off. . |
| 0479580 | 4/1992 | European Pat. Off. . |
| 410910 | 1/1992 | Japan . |
| 410912 | 1/1992 | Japan . |
| 416313 | 1/1992 | Japan . |
| 421407 | 1/1992 | Japan . |
| 421408 | 1/1992 | Japan . |

OTHER PUBLICATIONS

*Database WPIL*, Derwent Publications Ltd., London, GB; AN 92–070167 & JP–A–04016313 (Mitsui Petrochemical), 21 Jan. 1992.

*Primary Examiner*—Carman J. Seccuro, Jr
*Attorney, Agent, or Firm*—Stevens, Davis, Miller & Mosher

[57] ABSTRACT

This invention provides a thermoplastic elastomer powder produced by a gas polymerization process by the use of a specified catalyst system which is excellent in powder fluidity, retains a high fluidity even in a state where no substantial forming pressure is applied and can be formed by powder molding process, as well as a powder molding process using said elastomer powder and a molded product of said molding process.

11 Claims, 3 Drawing Sheets

POWDER MOLDING PROCESS USING A THERMOPLASTIC ELASTOMER POWDER

CROSS-REFERENCE TO RELATED APPLICATIONS

This is a continuation-in-part application of Ser. No. 038,947, filed on Mar. 29, 1993, now abandoned.

The present invention relates to an olefinic thermoplastic elastomer powder for use in powder molding, a powder molding process using said powder, and a molded product obtained by the process.

More particularly, the present invention relates to a thermoplastic elastomer powder for use in powder molding techniques such as powder slush molding and the like, which techniques are suitable for the production of backing and skin materials for various molded products, housing and the like; a powder molding process using the powder and a molded product obtained by the process.

In the field of covering materials as interior trims of automobiles, there have become requested recently with an increasing desire such materials that are soft and light in weight and have a high-class feeling, grain leather or stitch pattern. Further, demand for environmentally friendly materials is increasing. This is because acidic substances are formed upon incineration of interior trim materials in the process of disposing waste cars, pollute the atmospheric air and cause acid rain, whereby serious social problems arise.

Conventional covering materials for the above-mentioned use include vacuum molded products of olefinic thermoplastic elastomer (hereinafter referred to as TPO) sheets, vacuum molded products of sheets constituted mainly of vinyl chloride resin and ABS resin, products obtained by rotational molding or slush molding of a sol constituted mainly of a paste-making vinyl chloride resin and a plasticizer (hereinafter referred to as sol molded products), and the like.

Of these materials, the vacuum molded products of TPO are disadvantageous in that they are difficult to form into a complicated shape, although they are satisfactory in their light weight and non-environmental pollution properties.

In addition, the vacuum molded products are disadvantageous in that they hold great residual strains after molding and are readily cracked in a long-term use.

The vacuum molded products of a sheet constituted mainly of vinyl chloride resin and ABS resin are also disadvantageous in that they are difficult to form into complicated shape like the vacuum molded products of TPO, and further they are inferior to TPO in lightness in weight and non-environmental pollution properties.

The molded products of sol constituted mainly of a paste-making vinyl chloride resin and a plasticizer have a soft feeling and can be formed into complicated shapes. However, they are disadvantageous in many respects. For example, they are low in the gelation temperature and therefore melt rapidly in the die. As a result, they cause various troubles in processing, such as appearance of flow mark, lipping, stringing of sol, etc. In addition, vinyl chloride resins are inherently disadvantageous in that they are heavy in weight and inferior in non-environmental pollution properties. Further, for vinyl chloride resins is used a large quantity of plasticizer which causes fogging on the inside surface of automobile window glass.

From the viewpoint of these disadvantages and problems, powder molding process has recently been highlighted out of various molding processes.

Powder molding process generally includes powder slush molding process, fluidization dipping process, electrostatic coating process, powder flame spraying process and powder rotational molding process. Of these, powder slush molding process is particularly suitable for production of the covering of automobile interior trim.

TPO is well known in the art. For example, JP-A-48-26838, JP-A-53-149240, etc. disclose partially crosslinked TPO compositions.

As molding processes having been applied to the hitherto disclosed partially crosslinked TPO compositions, the following can be referred to:

a: injection molding (shearing velocity at the time of processing $(\gamma) \geq 10^3$ sec$^{-1}$)

b: extrusion molding ($10^1 \leq \gamma 10^2$ sec$^{-1}$)

c: calendering ($10^2 \leq \gamma \leq 10^3$ sec$^{-1}$)

d: primary processing by b or c, followed by compression molding e: primary processing by b or c, followed by vacuum molding, etc. All these molding processes, however, require a temperature higher than the softening point and a forming pressure fit for the viscosity at the shearing velocity under the respective processing conditions.

Under the conditions of powder molding, the shearing velocity at the time of processing is $10^0$ sec$^-$or less or the frequency of vibration is 1 radian/second or less, and the polymer to be processed is in a nearly stationary state. That is, the pressure applied to the polymer in the process of forming is zero or very low ($\leq 1$ kg/cm$^2$). Under such conditions, there occurs an extreme deficiency of fluidity so that molding is difficult to effect. If molding can be effected, the low fluidity of the polymer to be processed in the low shearing velocity region causes an imperfect thermal fusion between powder particles, due to which the conventional techniques have been unable to give a molded product with sufficiently high mechanical properties.

Thus, there has been proposed a technique for obtaining a molded product of TPO by powder rotational molding process which comprises melting a TPO showing a low fluidity in the low shearing velocity region while closely contacting the TPO in a fluidized and plasticized state with the inner surface of a rotated and heated die. An example of such a technique is disclosed in JP-A-2-57309. JP-A-2-57309 says:

1) an emboss-patterned molded product of a thermoplastic elastomer characterized in that an emboss pattern is formed on the surface of the molded product by the melting of powders of a thermoplastic elastomer comprising a polyolefin resin and an ethylene-α-olefin copolymer rubber closely contacting with the inner surface of a heated rotating emboss pattern-transferring die in a fluidized and plasticized state, and 2) a process for producing a molded product of a thermoplastic elastomer which comprises introducing powders of a thermoplastic elastomer comprising a polyolefin resin and an ethylene-α-olefin copolymer rubber into an emboss pattern-transferring die, tightly closing the die, heating the tightly closed die with rotation, closely contacting the thermoplastic elastomer powders in a fluidized and plasticized state with the inner surface of the heated rotating die to melt the powders, and cooling the die with the inner surface of which the thermoplastic elastomer powders closely contact to obtain a molded product of thermoplastic elastomer having an emboss pattern on the surface.

However, this technique has a problem that it is yet insufficient in the fluidity of TPO powders in the low shearing velocity region, due to which the thermal fusion strength between the powder particles is insufficient and pin-holes are readily formed. Thus, there has not been obtained a molded product sufficiently satisfactory in appearance and properties.

On the other hand, according to the above-mentioned conventional processes for producing an olefinic thermoplastic elastomers, a polypropylene or other polyolefin resin and an olefinic copolymer rubber such as ethylene-propylene rubber or the like have been separately produced before they are blended together. As is well known, however, such processes are disadvantageous from the viewpoint of production cost because olefinic copolymer rubbers are generally produced by solution polymerization process. They are also disadvantageous in view of production cost because the blending of an olefinic copolymer rubber with a polyolefin resin requires a high extent of kneading which consumes a great quantity of energy.

Some powder molding processes of a thermoplastic elastomer have been proposed in JP-A-4-10910, 4-10912, 4-16313, 4-21407, 4-21408, etc. Regarding the powders used, these inventions are characterized by using "a polymer particle consisting of a crystalline olefin polymer portion and an amorphous olefin polymer portion" or "a mixture comprising a polyolefin resin and an α-olefinic copolymer rubber". Regarding the production process of molded product, these inventions are characterized by "introducing powders into an emboss pattern transferring die, heating the powders while rotating the die, closely contacting the powders in a fluidized and plasticized state with the inner surface of the die to melt the powders" or "making powders melt and adhere to the inner surface of a heated emboss pattern-transferring die".

However, these processes have a problem in productivity or energy cost because the crosslinking reaction is carried out simultaneously with molding which prolongs the molding cycle, and because for shortening the molding cycle the die temperature at the time of molding must be elevated. Further, if some kinds of crosslinking agents are used at the time of molding, a gas is formed upon the reaction which forms pin-holes on the surface of molded products or some of the gases are combustible and therefore undesirable from the viewpoint of safety. Further, there is a problem that the residue of the decomposition of crosslinking agent plates out to stain the die. Thus, none of these conventional processes has yet given a molded product sufficiently satisfactory in appearance and properties.

An object of this invention is to provide a thermoplastic elastomer powder for use in powder molding free from the above-mentioned problems produced by an inexpensive gas polymerization process, retaining a high fluidity even in the state where no substantial forming pressure is applied, being capable of giving a molded product free from pin-hole and the like and having a sufficiently great thermal fusion strength between particles; a powder molding process using the thermoplastic elastomer powder and a molded product obtained by the molding process.

According to this invention, there can be provided a material, particularly suitable for use as a covering material for the interior trims of automobile and the like, made of a light-weight thermoplastic elastomer having non-environmental pollution properties, making the most of the merits of powder molding process which can form a material into a product with low residual strain, low hardness and complicated shape.

Figure 1:
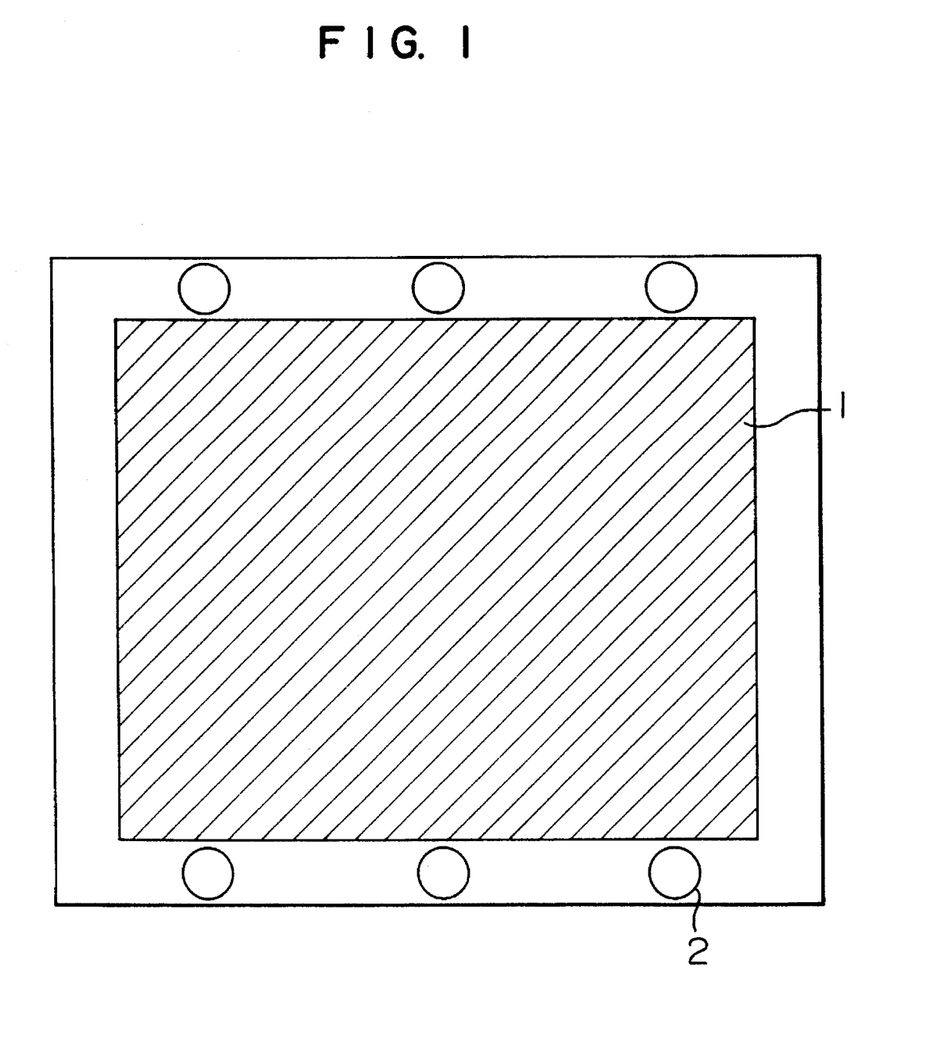
FIG. 1 is a plan view of a powder supply box.
Figure 2:
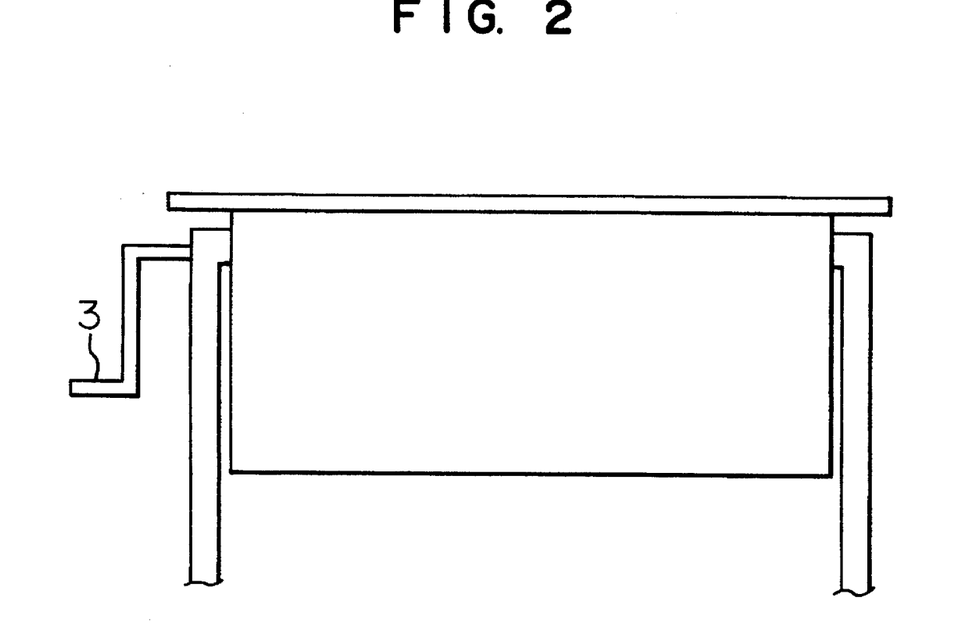
FIG. 2 is a front view of a powder supply box.
Figure 6:
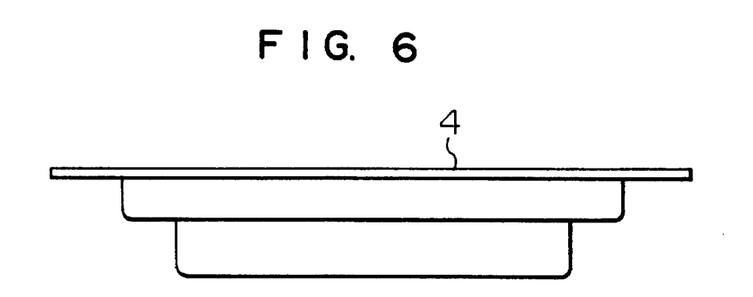
FIG. 6 is a side view of a mold.

In FIG. 1, 1 refers to an opening, and 2 refers to a clamp. In FIG. 2, 3 refers to a driver. In FIG. 6, 4 refers to an opening.

This invention relates to a thermoplastic elastomer powder for use in powder molding process which is obtained by polymerizing propylene in liquefied propylene and/or gas phase to obtain a propylene-based prepolymer and randomcopolymerizing ethylene and α-olefin in the presence of the propylene-based prepolymer in a gas phase by the use of a catalyst system consisting of:

(A) a solid catalyst component comprising a porous carrier and a polymerization accelerator comprising titanium, magnesium and halogen supported on the porous carrier, (B) an organoaluminum compound, and (C) an electron donative compound, the elastomer powder having a complex dynamic viscosity $\eta^*$ (1) at a frequency of 1 radian/second of $1.5 \times 10^5$ poises or below as determined by dynamic viscoelasticity measurement at 250° C., and having a Newtonian viscosity index n of 0.67 or below as calculated from complex dynamic viscosity at a frequency of 1 radian/second $\eta^*$ (1) and complex dynamic viscosity at a frequency of 100 radians/second $\eta^*$ (100) according to the following equation:

$$n = \{\log \eta^* (1) - \log \eta^* (100)\}/2.$$

(2) This invention further relates to a thermoplastic elastomer powder for use in powder molding process according to paragraph (1), wherein the polymerization of propylene in liquefied propylene and/or gas phase is carried out in the presence of a small quantity of ethylene and/or α-olefin having 4 or more carbon atoms.

(3) This invention further relates to a thermoplastic elastomer powder for use in powder molding process according to paragraph (1), wherein the random copolymerization of ethylene and α-olefin in gas phase is carried out in the presence of a small quantity of a diene.

(4) This invention further relates to a powder molding process using the thermoplastic elastomer powder according to any one of paragraphs (1)–(3), and to a molded product obtained by the molding process.

As used in this invention, the term "powder molding process" inclusively means powder slush molding process, fluidized bed dipping process, electrostatic coating process, powder flame spraying process, powder rotational molding process and the like.

The methods for heating the die used in the powder molding process of this invention include gas oven method, heat transfer oil circulation method, method of dipping in heat transfer oil or fluidized hot sand bed, high frequency induction heating method, and the like.

It is necessary that the thermoplastic elastomer powder used in such powder molding process is excellent in powder fluidity and readily fusible by the heat supplied mainly from the die at a low shearing velocity and under a low pressure.

The characteristic feature of this invention consists in that the invention has enabled a development into a molding process requiring a high fluidity in the low shearing velocity region, such as powder molding processes including powder slush molding process which have been out of the object of the conventional TPO molding processes, owing to the use of an elastomer composition having a specified viscoelasticity among the thermoplastic elastomer powders produced by gas polymerization.

Next, this invention will be explained in more detail.

(a) Solid catalyst component

The solid catalyst component used in this invention is prepared by impregnating a porous carrier with a polymerization accelerator comprising titanium, magnesium and halogen.

The performances required of the catalyst of this invention are that the catalyst can exhibit a sufficiently high acceleration activity in the random copolymerization between ethylene and α-olefin or between two or more different α-olefins to form a copolymer of excellent properties, and that the catalyst can form a polymer particle of excellent particle characteristics. Further, when a multi-stage polymerization is carried out and a polymer constituted mainly of polypropylene is produced in its process, the catalyst is additionally required to have a high stereospecificity.

According to a study of the present inventors, the use of a solid catalyst component having a high catalytic activity of $5\times10^4$ g or more, preferably $7.5\times10^4$ g or more and particularly preferably $10\times10^4$ g or more, as expressed in terms of the total polymer formation per gram of titanium atom in the solid catalyst component is advantageous in that a thermoplastic elastomer can be produced without substantial practice of the step for deashing the catalyst residue.

For production of a copolymer having excellent particle characteristics, the mean particle diameter of the solid catalyst component is an important factor. Thus, it is desirable that the means particle diameter of solid catalyst component is in the range of 5–200 μm and preferably 10–100 μm. If the mean particle diameter is smaller than 5 μm, adhesion of polymer particles tends to increase, and in the case of using a fluidized bed type gas phase reactor, the problem of flying of catalyst and polymer particle sometimes occurs. On the other hand, if the means particle diameter is greater than 200 μm, the polymer powder obtained by such a production process sometimes brings about a problem of imperfect thermal fusion between powder particles when applied to powder molding process.

The solid catalyst component will be explained below more specifically.

The porous materials used as a porous carrier in this invention may be any of the known ones. Specific examples of the porous materials are porous inorganic oxides represented by $SiO_2$, $Al_2O_3$, MgO, $TiO_2$, $ZrO_2$, $SiO_2$—$Al_2O_3$ composite oxide, MgO—$Al_2O_3$ composite oxide, MgO—$SiO_2$—$Al_2O_3$ composite oxide and the like; and porous organic polymers of polystyrene type, polyacrylic ester type, polymethacrylic ester type, polyacrylonitrile type, polyvinyl chloride type and polyolefin type represented by polystyrene, styrene-divinylbenzene copolymer, styrene-N,N'-alkylenedimethacrylamide copolymer, styrene-ethylene glycol dimethyl methacrylate copolymer, polymethyl acrylate, polyethyl acrylate, methyl acrylate-divinylbenzene copolymer, ethyl acrylate-divinylbenzene copolymer, polymethyl methacrylate, methyl methacrylate-divinylbenzene copolymer, polyethylene glycol dimethyl methacrylate, polyacrylonitrile, acrylonitrile-divinylbenzene copolymer, polyvinyl chloride, polyvinylpyrrolidine, polyvinylpyridine, ethylvinylbenzene-divinylbenzene copolymer, polyethylene, ethylene-methyl acrylate copolymer, polypropylene and the like. Of these porous materials, porous polymer beads of polystyrene type, polyvinyl chloride type, polyolefin type and polyacrylonitrile type and porous oxides selected from $SiO_2$, $Al_2O_3$ and $SiO_2$—$Al_2O_3$ composite oxide are preferable; styrene-divinylbenzene copolymer, acrylonitrile-divinylbenzene copolymer, $SiO_2$ and $Al_2O_3$ are more preferable; and styrene-divinylbenzene copolymer and $SiO_2$ are particularly preferable.

The porous material has a volume of pores having a radius falling within the range of from 35 to 75,000 Å of, with increasing preference, 0.3 ml/g or more and 0.4 ml/g or more. The volume of pores having a radius falling within the range of from 200 to 2,000 Å of the porous material preferably accounts for 35% or more, more preferably 40% or more, of the volume of pores having a radius falling within the range of from 35 to 75,000 Å. If the volume of pores having a radius falling within the range of from 35 to 75,000 Å is less than 0.3 ml/g, the porous material sometimes cannot effectively support the catalyst component. If the radius of the pores does not fall within the range of 200 to 2,000 Å even when the volume of pores having a radius falling within the range of from 35 to 75,000 Å is larger than 0.3 ml/g, the porous material sometimes cannot effectively support the catalyst component. In such a case, the catalyst obtained from the porous material does not enable effective production of thermoplastic elastomer powders that the present invention is trying to produce.

Mean particle diameter of the porous material is usually 5–200 μm and preferably 10–100 μm. The geometrical standard deviation σg of the particle size distribution of the porous material is usually 2.0 or smaller, and preferably 1.8 or smaller. If the mean particle diameter is smaller than 5 μm, adhesion of polymer particles tends to increase, and a problem of flying of catalyst and polymer particles sometimes occurs in the case of fluidized bed type reactor. To the contrary, if the mean particle diameter is greater than 200 μm, it tends to cause a problem of imperfect thermal fusion between the powder particles in the practice of powder molding.

The geometrical standard deviation σg of the particle size distribution can be determined from the following equation assuming that the particle size distribution can be expressed by a logarithmic probability distribution equation, wherein Dg is the particle diameter of a particle giving a cumulative weight fraction of 50% and Dp is the particle diameter of a particle giving a cumulative weight fraction of 15.8%:

$$\sigma g = \frac{Dg}{Dp}$$

When σg is greater than 2.0, there tends to arise a problem of formation of polymer particles having a form of fine powder or having a great particle diameter.

Next, the polymerization accelerator comprising titanium, magnesium and halogen will be explained specifically.

The polymerization accelerator of this invention is that generally called titanium-magnesium composite type catalyst, wherein the atomic ratio titanium/magnesium is 0.0–0.8, preferably 0.02–0.2, and the atomic ratio halogen/magnesium is 1.8–10, preferably 2.0–5.0.

The method for preparing such a catalyst component are disclosed in, for example, JP-B-58-21922, JP-A-59-126402, JP-B-35-495, JP-A-46-4393, JP-B-46-31330, JP-A-47-42283, 49-86483, JP-B-57-24361, JP-A-61-296007, 61-218606, JP-B-39-12105, 43-13050, 46-34092, 46-34098, 47-41676, 55-23561, etc.

As the method for impregnating a porous carrier with the polymerization accelerator, mechanical methods such as pulverization and the like or chemical method conducted in the state of a slurry can be employed. Of these, chemical method is preferable from the viewpoint of particle characteristics.

Specific examples of such a method include a method comprising impregnating an inorganic porous material such as silica gel or the like with a polymerization accelerator disclosed in JP-A-52-42585, 54-148093, 56-47407, 59-230006, 61-37803, 62-256802, 63-83106, 61-21109, 63-280707, etc., and a method comprising impregnating an organic porous material such as styrene-vinylbenzene copolymer or the like with a polymerization accelerator disclosed in JP-A-1-98604, 2-97508, etc.

For example:

(1) a method comprising treating a porous material with an organomagnesium compound such as Grignard reagent or the like and treating the resulting porous material with $TiCl_4$ or the like;

(2) a method comprising treating a porous material with an organomagnesium compound such as Grignard reagent or the like, reacting the porous material treated with an organomagnesium compound with a halogenating agent and/or an alcohol and treating the thus treated porous material with a titanium compound such as $TICL_4$ or the like;

(3) a method comprising dissolving a magnesium halide compound and/or an alkoxymagnesium compound in a donor such as alcohols, ethers and the like, forming a complex compound from the donor solution and $TICL_4$ and impregnating a porous material with the resulting complex compound;

(4) a method comprising dissolving a magnesium halide compound and/or an alkoxymagnesium compound in a donor such as alcohols, ethers and the like, impregnating a porous material with the donor solution, and treating the resulting porous material with a titanium compound such as $TiCl_4$ or the like;

(5) a method comprising reducing an alkoxytitanium compound with an organomagnesium compound such as Grignard reagent or the/hike in the presence of a porous material, and treating the resulting porous material with a mixture of an ether compound and titanium tetrachloride; and (6) a method comprising reducing an alkoxytitanium compound with an organoaluminum compound in the presence of a porous material and treating the resulting porous material with a mixture of an ether compound titanium tetrachloride.

The quantity of the polymerization accelerator with which the porous material is impregnated is usually within the range of 1–70% by weight, preferably within the range of 3–60% by weight, and particularly preferably within the range of 5–55% by weight, based on the weight of the solid catalyst component. If the quantity of the polymerization accelerator with which the porous material is impregnated is larger than 70% by weight, the particle characteristics of polymer tends to be deteriorated. If the quantity of the polymerization accelerator is smaller than 1% by weight, the activity per unit weight of the solid catalyst tends to be low.

The titanium compound used in the synthesis of the catalyst component used in this invention may be represented by the following general formula:

$$Ti(OR^1)_a X_b$$

wherein $R^1$ is a hydrocarbon group having 1–20 carbon atoms, X is a halogen atom, and a and b are numbers satisfying $0 \leq a \leq 4$, $0 \leq b \leq 4$ and a +b=3 or 4. Specific examples of suitably usable titanium compounds are titanium trichloride, ethoxytitanium dichloride, butoxytitanium dichloride, titanium tetrachloride, ethoxytitanium trichloride, butoxytitanium trichloride, phenoxytitanium trichloride, dibutoxytitanium dichloride, diphenoxytitanium dichloride, tributoxytitanium chloride, tetraethoxytitanium, tetrabutoxytitanium, tetraphenoxytitanium and the like.

The following magnesium compounds may be used.

Specific examples of suitably usable magnesium compounds with reducing capability having a magnesiumcarbon bond or a magnesium-hydrogen bond are diethylmagnesium, dibutylmagnesium, dihexylmagnesium, ethylmagnesium chloride, butylmagnesium chloride, hexylmagnesium chloride, butylethoxymagnesium, butylmagnesium hydride and the like. These magnesium compounds may be used in the form of a complex compound with an organoaluminum compound. On the other hand, specific examples of suitably usable magnesium compounds with no reducing capability are magnesium dihalides such as magnesium dichloride, magnesium dibromide and the like; alkoxymagnesium compounds such as methoxymagnesium chloride, ethoxymagnesium chloride, butoxymagnesium chloride, phenoxymagnesium chloride, diethoxymagnesium, dibutoxymagnesium, diphenoxymagnesium and the like; and magnesium carboxylates such as magnesium laurate, magnesium stearate and the like.

These magnesium compounds having no reducing capability may be synthesized according to known methods from a magnesium compound having a reducing capability either prior to or at the time of preparation of solid catalyst.

Further, a known ester compound may be incorporated into the solid catalyst component for the purpose of enhancing the stereospecificity. As such an ester compound, esters of monobasic and polybasic carboxylic acids including aliphatic carboxylic esters, olefin-carboxylic esters, alicyclic carboxylic esters and aromatic carboxylic esters may be used. Specific examples of the ester compound are methyl acetate, ethyl acetate, phenyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, di-n-propyl phthalate, diisopropyl phthalate, di-n-butyl phthalate, diisobutyl phthalate, di-n-heptyl phthalate, di-n-octyl phthalate, diphenyl phthalate and the like.

(b) Organoaluminum compound

The organoaluminum compound B) to be used in this invention in combination with the above-mentioned solid catalyst component A) is a compound having at least one Al-carbon bond in its molecule. Typical examples of such an organoaluminum compound are those represented by the following formulas:

$$R^2_c AlY_{3-c}$$

$$R^3 R^4 Al-O-AlR^5 R^6$$

wherein $R^2$, $R^3$, $R^4$, $R^5$ and $R^6$ each represent a hydrocarbon group having 1–8 carbon atoms, Y represents halogen, hydrogen or alkoxy group, and c represents a number satisfying $1 \leq c \leq 3$.

Specific examples of the organoaluminum compound are trialkylaluminums such as triethylaluminum, triisobutylaluminum, trihexylaluminum and the like; dialkylaluminum hydrides such as diethylaluminum halide, diisobutylaluminum hydride and the like; mixtures of a trialkylaluminum and a dialkylaluminum halide; and alkylalumoxanes such as tetraethyldialumoxane, tetrabutyl-dialumoxane and the like.

Of these organoaluminum compounds, trialkylaluminums, mixtures of trialkylaluminum and dialkylaluminum halide, and alkylalumoxanes are preferable, and triethylaluminum, triisobutylaluminum, a mixture of triethylaluminum and diethylaluminum chloride and tetraethyldialumoxane are particularly preferable.

The quantity of the organoaluminum compound can be selected from so wide a range as 1–1,000 moles per mole of titanium atom in the solid catalyst. Particularly preferable range of the quantity of the organoaluminum compound is 5–600 moles per mole of titanium atom in the solid catalyst.

(c) Electron donative compound

The electron donative compound used at the time of polymerization in this invention is selected from organic silicon compounds having Si—$OR^7$ bond, wherein $R^7$ is a hydrocarbon group having 1–20 carbon atoms, or Si—N—C bond, aromatic carboxylic ester compounds and sterically hindered amines.

As the organic silicon compound, the alkoxysilane compounds represented by the following general formula:

$R^8{}_t Si(OR^7)_{4-t}$ wherein $R^7$ and $R^8$ each represent a hydrocarbon group having 1–20 carbon atoms and t represents a number satisfying $0 \leq t \leq 3$, are preferably used.

Specific examples of the aromatic carboxylic ester compound are methyl benzoate, ethyl benzoate, propyl benzoate, isopropyl benzoate, butyl benzoate, phenyl benzoate, methyl toluate, ethyl toluate, methyl anisate, ethyl anisate, monoethyl phthalate, dimethyl phthalate, methyl ethyl phthalate, diethyl phthalate, dipropyl phthalate, diisopropyl phthalate, dibutyl phthalate, diisobutyl phthalate, diheptyl phthalate, dioctyl phthalate, diphenyl phthalate and the like.

Specific examples of the sterically hindered amine are substituted methylenediamine compounds such as 2,6-substituted piperidines, 2,5-substituted pyrrolidines, N,N,N',N'-tetramethylmethylenediamine and the like.

Of these electron donative compounds, the alkoxysilane compounds represented by general formula $R^8{}_t(OR^7)_{4-t}$ and the 2,6-substituted piperidines give particularly good results.

Specific examples of the alkoxysilane compound are as follows:

Si—(OCH$_3$)$_4$,
CH$_3$—Si—(OCH$_3$)$_3$,
(CH$_3$)$_2$—Si—(OCH$_3$)$_2$,
(C$_2$H$_5$)$_2$—Si—(OCH$_3$)$_2$,

(isoC$_4$H$_9$)$_2$—Si—(OCH$_3$)$_2$,
(C$_8$H$_17$)$_2$—Si—(OCH$_3$)$_2$,
C$_2$H$_5$—Si—(OCH$_3$)$_3$,

-continued
isoC$_4$H$_9$—Si—(OCH$_3$)$_3$,
C$_8$H$_{17}$—Si—(OCH$_3$)$_3$,

Si—(OC$_2$H$_5$)$_4$,
CH$_3$—Si—(OC$_2$H$_5$)$_3$,
C$_2$H$_5$—Si—(OC$_2$H$_5$)$_3$,
C$_2$H$_3$—Si—(OC$_2$H$_5$)$_3$,

C$_4$H$_9$—Si—(OC$_2$H$_5$)$_3$,
C$_2$H$_3$—Si—(OC$_4$H$_9$)$_3$,
(C$_2$H$_5$)$_2$—Si—(OC$_2$H$_5$)$_2$,

-continued isoC$_3$H$_7$—Si(C$_4$H$_9$)—(OC$_2$H$_5$)$_2$, isoC$_3$H$_7$—Si(C$_5$H$_{11}$)—(OC$_2$H$_5$)$_2$, isoC$_3$H$_7$—Si(C$_6$H$_{13}$)—(OC$_2$H$_5$)$_2$, isoC$_4$H$_9$—Si(CH$_3$)—(OCH$_3$)$_2$, isoC$_4$H$_9$—Si(C$_2$H$_5$)—(OCH$_3$)$_2$, isoC$_4$H$_9$—Si(C$_3$H$_7$)—(OCH$_3$)$_2$, isoC$_4$H$_9$—Si(C$_4$H$_9$)—(OCH$_3$)$_2$, isoC$_4$H$_9$—Si(C$_5$H$_{11}$)—(OCH$_3$)$_2$, isoC$_4$H$_9$—Si(C$_6$H$_{13}$)—(OCH$_3$)$_2$, isoC$_4$H$_9$—Si(CH$_3$)—(OC$_2$H$_5$)$_2$, isoC$_4$H$_9$—Si(C$_2$H$_5$)—(OC$_2$H$_5$)$_2$, isoC$_4$H$_9$—Si(C$_3$H$_7$)—(OC$_2$H$_5$)$_2$, isoC$_4$H$_9$—Si(C$_4$H$_9$)—(OC$_2$H$_5$)$_2$, isoC$_4$H$_9$—Si(C$_5$H$_{11}$)—(OC$_2$H$_5$)$_2$, isoC$_4$H$_9$—Si(C$_6$H$_{13}$)—(OC$_2$H$_5$)$_2$, tertC$_4$H$_9$—Si(CH$_3$)—(OCH$_3$)$_2$, tertC$_4$H$_9$—Si(C$_2$H$_5$)—(OCH$_3$)$_2$, tertC$_4$H$_9$—Si(C$_3$H$_7$)—(OCH$_3$)$_2$, tertC$_4$H$_9$—Si(C$_4$H$_9$)—(OCH$_3$)$_2$, tertC$_4$H$_9$—Si(CH$_3$)—(OC$_2$H$_5$)$_2$, tertC$_4$H$_9$—Si(C$_2$H$_5$)—(OC$_2$H$_5$)$_2$, tertC$_4$H$_9$—Si(C$_3$H$_7$)—(OC$_2$H$_5$)$_2$, tertC$_4$H$_9$—Si(C$_4$H$_9$)—(OC$_2$H$_5$)$_2$, C$_2$H$_5$—C(CH$_3$)(CH$_3$)—Si(CH$_3$)—(OCH$_3$)$_2$, C$_2$H$_5$—C(CH$_3$)(CH$_3$)—Si(C$_2$H$_5$)—(OCH$_3$)$_2$, C$_2$H$_5$—C(CH$_3$)(CH$_3$)—Si(C$_3$H$_7$)—(OCH$_3$)$_2$, C$_2$H$_5$—C(CH$_3$)(CH$_3$)—Si(C$_4$H$_9$)—(OCH$_3$)$_2$, C$_2$H$_5$—C(CH$_3$)(CH$_3$)—Si(CH$_3$)—(OC$_2$H$_5$)$_2$, C$_2$H$_5$—C(CH$_3$)(CH$_3$)—Si(C$_2$H$_5$)—(OC$_2$H$_5$)$_2$, C$_2$H$_5$—C(CH$_3$)(CH$_3$)—Si(C$_3$H$_7$)—(OC$_2$H$_5$)$_2$, C$_2$H$_5$—C(CH$_3$)(CH$_3$)—Si(C$_4$H$_9$)—(OC$_2$H$_5$)$_2$, cyclohexyl—Si(CH$_3$)—(OCH$_3$)$_2$, cyclohexyl—Si(C$_2$H$_5$)—(OCH$_3$)$_2$, cyclohexyl—Si(C$_3$H$_7$)—(OCH$_3$)$_2$, cyclohexyl—Si(isoC$_3$H$_7$)—(OCH$_3$)$_2$, cyclohexyl—Si(C$_4$H$_9$)—(OCH$_3$)$_2$,

-continued

-continued

Specific examples of the 2,6-substituted piperidine are 2,2,6,6-tetramethylpiperidine and the like.

The electron donative compound is usually used in an amount of 0.01–5 moles, preferably 0.03–3 moles and particularly preferably 0.05–1.0 mole, per mole of the aluminum atom in the organoaluminum compound constituting the component B).

(d) Polymerization method

In this invention, a granular thermoplastic elastomer is produced by the use of the above-mentioned catalyst system in substantially separated two steps.

The first step of the polymerization process of this invention is carried out in the presence of the above-mentioned catalyst system in liquefied propylene and/or in gas phase. In other words, one of the objects of this invention can be achieved by any of a method of carrying out a polymerization in liquefied propylene, a method of carrying out a polymerization in liquefied propylene and thereafter carrying out a polymerization in gas phase and a method of carrying out a polymerization in gas phase.

The embodiment of the first step of the polymerization is described below.

The polymerization can be carried out either as a homopolymerization of propylene or as a copolymerization of propylene and a comonomer which may be ethylene or an α-olefin having 4–6 carbon atoms. The quantity of the comonomer is preferably controlled so that the content of the comonomer in the polymer formed in this step comes to 30% by mole or less, and most preferably 15% by mole or less.

When the polymerization is carried out in liquefied propylene, it is preferably carried out in the temperature range of 40°–90° C. in the pressure range of 17–50 kg/cm$^2$. When the polymerization is carried out in a gas phase, it is usually carried out at a temperature not higher than the temperature at which the polymer melts, preferably in the temperature range of 40°–100° C., at the pressure range from ordinary pressure to 40 kg/cm$^2$, under conditions preventing liquefaction of the monomers in the polymerization reactor. Further, in the first step, the polymerization is preferably carried out with addition of a molecular weight regulator such as hydrogen or the like for the purpose of improving the melt fluidity of the product. The product from the first step is referred to as a propylene-based prepolymer, which includes propylene homopolymers and copolymers of propylene and either ethylene or an α-olefin.

The second step of the polymerization is carried out subsequently to the first step of polymerization. Thus, ethylene and an α-olefin are randomcopolymerized in presence of a propylene-based prepolymer in a gas phase. Specific examples of the α-olefin to be copolymerized with ethylene are propylene, butene-1, pentene-1, hexene-1, 4-methylpentene-1, 3-methylbutene-1 and the like. Of these, propylene and butene-1 are particularly preferable.

In the second step of polymerization of this invention, ethylene and α-olefin and optionally a polyene may be copolymerized. Specific examples of the polyene are butadiene, dicyclopentadiene, 1,4-hexadiene, 1,3,7-octatriene, vinylcyclohexene, 5-ethylidene-2-norbornene, 5-isopropenyl-2-norbornene, cyclooctadiene and the like. Of these, non-conjugated dienes are particularly preferable.

From the viewpoint of the properties of the resulting thermoplastic elastomer, the content of ethylene in the ethylene/α-olefin random copolymer portion is preferably within the range of 15–90% by mole, preferably within the range of 20–85% by mole. If the ethylene content in the resulting random copolymer portion exceeds 90% by mole, the rubbery property is sometimes undesirably deteriorated. If the content is smaller than 15% by mole, low temperature characteristics and rubbery property of the thermoplastic elastomer are sometimes undesirably deteriorated.

Further, in this invention, the second step can be carried out in two or more stages while changing the concentration of ethylene. The conditions of the polymerization are preferably controlled so that the temperature is maintained at a temperature not higher than the temperature at which the polymer melts, more preferably in the temperature range of 20°–85° C. and particularly preferably in the temperature range of 40°–75° C., at a pressure ranging from the ordinary pressure to 40 kg/cm², under conditions preventing liquefaction of the monomers in the polymerization reactor. Further, in the second step, the polymerization is preferably carried out with addition of a molecular weight regulator such as hydrogen or the like for the purpose of regulating the melt fluidity of the final product.

It is desired in this invention that the random copolymer portion formed in the second step occupies 5–80% by weight, preferably 20–80% by weight, of the total weight of the thermoplastic elastomer. The greater the occupation of the random copolymer portion formed in the second step, the richer the rubbery properties of the thermoplastic elastomer. Inversely, the smaller the occupation of the random copolymer portion in the second step, the more plastic the properties of the thermoplastic elastomer.

The polymerization reactor used for practicing this invention is not critical, but known reactors such as agitation-mixing tank reactor, fluidized bed reactor, fluidized bed reactor with an agitator, loop type reactor and the like can be used.

The polymerization of this invention can be carried out by any of a method of continuously carrying out polymerization using two or more reactors combined together in series, a method of batch-wise carrying out polymerization using one or more reactors, and combinations of the above-mentioned two methods.

(e) Polymer

The thermoplastic elastomer powder thus produced may be put to use, if desired, after crosslinking. As the crosslinking agent, organic peroxides are successfully usable. Of the organic peroxides, dialkyl peroxides are preferred. More preferably, the crosslinking is carried out by using a very small quantity of the organic peroxide in the presence of a crosslinking assistant such as bismaleimide compounds. The bismaleimide compound is usually used in an amount of 1.5 parts by weight or less and preferably 0.6 part by weight or less, per 100 parts by weight of the thermoplastic elastomer powder. The organic peroxide as a crosslinking agent is usually used in an amount of 0.4 part by weight or less, preferably 0.1 part by weight or less and more preferably 0.07 part by weight or less, on the same basis as above.

In this invention, the complex dynamic viscosity $\eta^*$ (1) of the elastomer powder, determined by a dynamic viscoelasticity measurement at 250° C. at a frequency of 1 radian/second, is $1.5 \times 10^5$ poises or less, preferably $1.0 \times 10^5$ poises or less and more preferably $3.0 \times 10^4$ poises or less.

If the complex dynamic viscosity $\eta^*$ (1) measured at a frequency of 1 radian/second exceeds $1.5 \times 10^5$ poises, the elastomer powder becomes unmelting on the die surface, and such a powder cannot be molded by the powder molding process in which the shearing velocity at the time of molding is so low as 1/sec$^{-1}$ or below.

Further, in the elastomer powder of this invention, the Newtonian viscosity index n calculated according to the following equation from complex dynamic viscosity $\eta^*$ (1) determined by a dynamic viscoelasticity measurement at 250° C. at a frequency of 1 radian/second and complex dynamic viscosity $\eta^*$ (100) determined by the same measurement as above at a frequency of 100 radians/second is 0.67 or smaller, preferably 0.60 or smaller and more preferably 0.53 or smaller:

$$n=\{\log \eta^* (1) - \log \eta^* (100)\}/2$$

If the Newtonian viscosity index n exceeds 0.67, the molded product is inferior in mechanical properties even if the complex dynamic viscosity $\eta^*$ (1) measured at a frequency of 1 radian/second is $1.5 \times 10^5$ poises or below, because such a powder is high in the frequency-dependence of complex dynamic viscosity and the thermal fusion between the melted elastomer powder particles is imperfect in the powder molding process in which the shearing velocity at the time of molding is so small as 1 sec$^{-1}$ or below and the forming pressure at the time of molding is so small as 1 kg/cm² or below.

The melt flow rate (MFR) of the thermoplastic elastomer powder obtained according to this invention falls within the range of, with increasing preferance, 15–200 g/10 minutes, 20–150 g/10 minutes and 25–120 g/10 minutes, as measured at a temperature of 230° C. under a testing load of 2.16 kg. If MFR is too small, the thermal fusion between the powder particles at the time of powder molding tends to be imperfect. If MFR is too great, coalescence of powder particles sometimes takes place in the process of polymerization which sometimes makes impossible a stable practice of gas phase polymerization.

Desirably, the mean particle diameter of the thermoplastic elastomer powder is 1,000 μm or smaller and preferably 850 μm or smaller. If the mean particle diameter of the thermoplastic elastomer powder is too great, there sometimes occurs unevenness in thickness of molded products during powder molding process. The unevenness in thickness gives an uneven flexibility to the molded products which would cause the appearance of fold wrinkles and thereby deteriorates commercial value of the product.

A finely powdered organic or inorganic material may be added to the thermoplastic elastomer powder obtained according to this invention for the purpose of preventing the phenomenon of re-coalescence (adhesion with each other).

As used herein, the term "finely powdered organic or inorganic material" referred to fine powdery materials having a mean particle diameter of 50 μm or less and having a glass transition temperature higher than room temperature or a melting point higher than room temperature. Specific examples of such materials are powders of polyolefin resins, talc, kaolinite, silicon oxide, aluminum oxide and the like. Of these, powder of polyolefin resins are particularly preferable because they do not lower the thermal fusion strength between elastomer powder particles at the time of molding. Preferably, the polyolefin resin powder as a re-coalescence preventer is added in an amount of 0.2–20 parts by weight per 100 parts by weight of the thermoplastic elastomer powder. If its amount is smaller than 0.2 part by weight, the effect of re-coalescence prevention is sometimes not attainable. If its amount exceeds 20 parts by weight, flexibility of the molded product is sometimes deteriorated. Thus, its preferable amount is within the range of 0.5–15 parts by weight.

At the time of demolding the molded product prepared by powder molding of the elastomer powder, it can occur that the adhesion to the inner surface of die is too strong so that pulling by force can sometimes cause a formation of fold wrinkle or whitening troubles. Thus, it is sometimes necessary to coat the inner surface of die prior to the molding with a generally used demolding agent such as dimethylpolysiloxane or the like. In the continuous production of a large number of products, however, the application of demolding agent is necessary every several products, which leads to an enhancement of the production cost. Such a demerit may be avoidable by improving the material quality of die. A more effective alternative therefor, however, is to incorporate a methylpolysiloxane compound as an internal demolding agent into the elastomer powder in an amount not exceeding 2 parts by weight per 100 parts by weight of the elastomer powder. The methylpolysiloxane compound used for this purpose may be selected arbitrarily so far as its viscosity at 25° C. is 20 centistokes or above. The preferable range of its viscosity is 50–5,000 centistokes. Too high a viscosity reduces the effect as a demolding agent. If the amount of the internal demolding agent exceeds 2 parts by weight, the thermal fusion between elastomer powder particles tends to be obstructed, and the molded product tends to become inferior in mechanical properties, and bleed-out of the internal demolding agent sometimes causes staining of the die. It is also possible to lessen the extent of re-coalescence after powdering by controlling the quantity of the internal demolding agent.

In this invention, known heat stabilizers such as phenol type, sulfite type, phenylalkane type, phosphite type, amine type and amide type stabilizers, as well as anti-aging agent, weather stabilizer, antistatic agent, metallic soap, lubricants such as wax, coloring pigments, and the like may be compounded in necessary amounts.

(f) Powder molding

According to the present invention, by utilizing the specific features of the powder molding method which can form moldings with a small residual molding stress, a low hardness and a complicated shape, there are provided covering materials, particularly those used as interior decorative materials for automobiles, made of a thermoplastic elastomer having a light weight and non-polluting.

In the present invention, the powder molding method includes molding methods such as flow dipping method, electrostatic coating method, flame spray coating method, powder rotational molding method, and powder slush molding method.

Said powder slush molding method includes, for example, the method, "comprising the steps of fixing a vessel having an opening and containing a necessary amount of a thermoplastic elastomer powder to a mold having an opening heated to a temperature sufficiently higher than the melting temperature of the thermoplastic elastomer powder so that the openings of the vessel and the mold are matched to each other or fixing the vessel in a hollow portion of the mold to be integrated, quickly feeding the powder to the portions within the mold while the mold is rotated and/or rocked, to cause the powder to be melted and adhered thereto, and if necessary, discharging the superfluous powder into the vessel".

The mold heating system to be used in the present invention includes a gas-fired furnace system, a heated oil circulation system, a system in which is carried out dipping into a heated oil or a hot fluidized sand, and a high frequency induction heating system.

The thermoplastic elastomer powder to be used in this powder molding method must have a high powder flowability under a low shear rate and a low pressure, and be easily melted by the heat supplied primarily from the mold (g) Uses The use of the molded product obtained according to this invention covers a variety of fields mentioned below. Thus, in the field of automobiles, it is suitable for use as interior skin materials such as instrument panel, console box, arm rest, head rest, door trim, rear panel, pillar trim, sun visor, trunk room trim, trunk lid trim, air bag container box, sheet buckle, head liner, grove box, steering wheel cover, ceiling material and the like, interior molded materials such as kicking plate, change lever boots, ceiling material and the like, and automobile exterior parts such as spoiler, side molding, number plate housing, mirror housing, air dam skirt, mud guard and the like.

In the field of domestic electric machines and OA machines, it is suitable for use as housing materials of television, video tape recorder, washing machine, drier, cleaner, cooler, air conditioner, remote control case, electronic range, toaster, coffee maker, pot, jar, plate cleaner, electric razor, hair drier, microphone, headphone, beauty tools, CD and cassette tape container, personal computer, typewriter, projector, telephone, copying machine, facsimile, telex and the like, and the skin materials thereof.

In the field of sports goods, it is suitable for use as sports shoes decoration parts, grip of various rackets, sports instruments and goods, skin materials of the saddle of bicycle, auto-bicycle and tricycle, their handle grips, and the like.

In the field of construction and houses, it is suitable for use as skin material of furniture, desks, chairs and the like, skin material of gate, door, wall and the like, skin material of wall-decoration material, ceiling decoration material and curtain wall, indoor flooring material of kitchen, wash room, toilet and the like, outdoor flooring material of veranda, terrace, balcony, car port and the like, and carpeting and cloths such as entrance mat, table cloth, coaster, ash tray cloth and the like.

In the field of industrial products, it is suitable for use as grip of electromotive tools, hose, and skin or backing materials thereof.

Apart from the above, it is suitable for use also as a material of trunk, skin material of case, file, note-book, album, stationery, camera body, dolls, toys and the like, molding materials such as watch band and the like, the outer flame of tablet and skin material thereof.

Next, this invention will be explained in more detail with reference to the following examples in no limitative way.

The characteristic properties referred to in the examples and comparative examples were determined according to the methods described below.

(1) Intrinsic viscosity (hereinafter abbreviated to $[\eta]$):

Measured in tetralin solvent at 135° C.

(2) Pore volume:

Volume of pores having a radius falling within the range of 35–75,000 Å was measured by the mercury injection method using as a measuring device Poresizer 9310 (porosimeter) manufactured by Micromellitic Co.

(3) Mean particle diameters of porous carrier and solid catalyst component:

Determined by optical microscopic observation.

(4) 20° C. Xylene-soluble fraction (hereinafter abbreviated to CXS):

One gram of polymer was dissolved in 200 ml of boiling xylene. The solution was slowly cooled to 50° C., the tube containing the solution was dipped in ice water and the solution was cooled down to 20° C. with stirring. The cooled solution was allowed to stand at 20° C. for 3 hours, and the deposited polymer was filtered off. Xylene was vaporized off from the filtrate and the residue was vacuum-dried at 60° C. to recover the polymer soluble in xylene at 20° C.

(5) Melt flow rate (hereinafter abbreviated to MFR):

Measured according to JIS K-7210 at a test temperature of 230° C. under a testing load of 2.16 kg.

(6) Dynamic viscoelasticity of elastomer composition

Using Dynamic Analyzer Model RDS-7700 manufactured by Rheometrics Co., the dynamic viscoelasticities at vibration frequencies of 1 radian/second and 100 radians/second were measured, from which complex dynamic viscosities $\eta^*(1)$ and $\eta^*(100)$ were calculated. The measurement was carried out in a parallel flat plate mode, at an additive strain of 5% and a sample temperature of 250° C.

From the values of η* (1) and η (100) thus determined, Newtonian viscosity index n was calculated according to the following equation:

$$n = \{\log \eta^* (1) - \log (100)\}/2$$

(7) Powder moldability

An electrically-cast, grained nickel board having a size of 15 cm×15 cm and a thickness of 3 mm was heated up to a surface temperature of 250° C. On the grained board was sprinkled 150 g of an elastomer powder. The powder was left to stand for 14 seconds until it adhered to the board. Thereafter, the unmelting fraction of the elastomer powder was rejected. The thus obtained grained board carrying fused powder thereon was heated for 60 seconds in an oven having an atmospheric temperature of 280° C. to melt the powder. The state of fusion of powder on a die and the properties of molded sheet obtained by cooling the die to 70° C. in water and removing the mold were observed, based on which the powder moldability was classified into the following four ratings:

++: The powder particles mutually fused sufficiently, and the resulting sheet had a sufficiently high tensile strength.

+: The powder particles mutually fused sufficiently, and the resulting sheet had a high tensile strength.

−: The powder particles mutually fused, but the resulting sheet had a low tensile strength and was brittle.

——: The powder particles did not fuse mutually, staying on the die as they were. Samples evaluated as ++ and + could be formed into the final product, while those evaluated as − and —— could not be formed into the final product.

(8) Properties of molded sheet

From each molded sheet obtained in the above item (7), test pieces were punched out by means of dampbell No. 1 mentioned in JIS K-6301. After conditioning the test pieces at 23° C., 50%RH for 24 hours, a tensile test was carried out at a tensile speed of 200 mm/minute by means of a tensile tester under the same conditions as above to measure the tensile strength at break.

EXAMPLE 1

(A) Synthesis of organomagnesium compound

The inner atmosphere of a 1-liter flask equipped with a stirrer, a reflux condenser, a dropping funnel and a thermometer was replaced with argon gas. Thereafter, 32.0 g of sliced metallic magnesium for Grignard reaction was put into the flask.

Then, a mixture of 120 g of n-butyl chloride and 500 ml of di-n-butyl ether was charged into the dropping funnel. About 30 ml of the mixture was dropped onto the sliced metallic magnesium placed at the bottom of the flask to start a reaction. After starting the reaction, the remaining portion of the mixture was dropwise added continuously over a period of 4 hours at 50° C. After completing the dropping, the resulting mixture was allowed to react at 60° C. for an additional one hour. Then, the reaction mixture was cooled to room temperature. From the cooled reaction mixture, solid matter was filtered off.

The thus obtained solution of n-butylmagnesium chloride in di-n-butyl ether was sampled and hydrolyzed with 1N sulfuric acid. Back-titration of hydrolyzed sample with 1N aqueous solution of sodium hydroxide using phenolphthalein as an indicator showed that the concentration of n-butylmagnesium chloride was 2.0 moles/liter.

(B) Synthesis of solid catalyst component

The inner atmosphere of a 200-ml flask equipped with a stirrer and a dropping funnel was replaced with argon gas. Then, 7.3 g of porous polymer beads was charged in the flask together with 73 ml of toluene, 0.28 g (0.83 millimole) of tetrabutoxytitanium and 2.68 g (12.8 millimoles) of tetraethoxysilane. The porous polymer beads was made of styrene-divinylbenzene copolymer and had been vacuum-dried at 100° C. for 6 hours. Porosimeter measurement showed that the copolymer had a dVp of 1.37 ml/g (dVp means the volume of pores (ml/g) having a radius falling within the range of 200–2,000 Å, herein after the same), a Vp of 2.30 ml/g (Vp means the volume of pores (ml/g) having a radius within the range of 35–75,000 Å, hereinafter the same) and a mean particle diameter of 40 μm. The resulting mixture was stirred at 30° C. for 45 minutes.

Subsequently, 6.4 ml of the solution of the organomagnesium compound synthesized in (A) was dropwise added from the dropping funnel over a period of 15 minutes, while maintaining the inner temperature of the flask at 5° C. After the dropping, the resulting mixture was stirred first at 5° C. for 45 minutes and thereafter at 30° C. for 45 minutes. Then the mixture was filtered, and the solid matter thus obtained was three times washed with each 40 ml portion of toluene.

After the washing, 18.2 ml of toluene and 2.9 ml (11.0 millimoles) of diisobutyl phthalate were put into the flask containing the washed solid matter, and allowed to react at 95° C. for 30 minutes.

After the reaction, a solid product was obtained. The solid product was collected by filtration at 95° C. and twice washed with each 45 ml portion of toluene.

After the washing, 18.5 ml of toluene, 0.29 ml (1.7 millimoles) of n-butyl ether, 0.28 ml (1.0 millimole) of diisobutyl phthalate and 36.5 ml (332 millimoles) of titanium tetrachloride were put into the flask containing the washed solid product and allowed to react at 95° C. for 3 hours. After the reaction, the solid matter was collected by filtration at 95° C. and twice washed with each 46 ml portion of toluene. Then, the above-mentioned treatment was repeated once more using a mixture of the washed solid matter, n-butyl ether, diisobutyl phthalate and titanium tetrachloride over a period of one hour to obtain a solid. The solid was twice washed with each 46 ml portion of n-hexane and dried under a reduced pressure to obtain 8.2 g of a light brown colored solid catalyst component.

The solid catalyst component thus obtained contained 0.24% by weight of titanium atom, 1.45% by weight of phthalic ester, 0.04% by weight of ethoxy group and 0.07% by weight of n-butoxy group. The solid catalyst component had a mean particle diameter of 40 μm.

(C) Polymerization

Using a 5-liter autoclave equipped with a stirrer, homopolymerization of propylene was carried out in the first step and random copolymerization of ethylene and propylene was carried out in the second step as follows.

The autoclave was dried at 80° C. for one hour and the inner pressure was reduced by means of a vacuum pump. 0.5 Gram of triethylaluminum, 0.13 g of cyclohexylethyldimethoxysilane and 127.2 mg of the solid catalyst component prepared in (B) were charged thereto. Hydrogen was fed to the autoclave up to a partial pressure of 4.0 kg/cm².

Then, 1.3 kg of liquefied propylene was fed into the autoclave with pressure, and the temperature was elevated to 70° C. Then, homopolymerization of propylene was carried out at 70° C. for 15 minutes. Thereafter, unreacted monomer was purged. A small quantity of the obtained polymer was sampled in order to measure $[\eta]_p$ and CXS. Then, 1.0 kg/cm² of hydrogen was fed to the autoclave, and the inner pressure of autoclave was elevated up to 6 kg/cm² G with propylene and up to 10 kg/cm² with ethylene, and the temperature of the autoclave was adjusted to 70° C. to start the polymerization of the second step.

Subsequently, ethylene/propylene copolymerization was carried out in gas phase for 180 minutes while feeding an ethylene/propylene mixture gas (50/50% by volume) so as to maintain a total pressure of at 10 kg/cm²G.

After completion of the copolymerization, unreacted monomer was purged, and there was obtained 195 g of a granular thermoplastic elastomer with desirable powder properties free from fine powder and coarse powder.

The formation of the finally produced polymer per gram of titanium atom in the solid catalyst component (g/g, hereinafter abbreviated to PP/Ti) was 638,000. On the other hand, CXS of the propylene homopolymer portion formed in the first step (hereinafter abbreviated to P) was 1.2% by weight.

The finally produced polymer contained the ethylene/propylene copolymer portion formed in the second step (hereinafter abbreviated to EP) in a quantity of 54% by weight. The ethylene content in EP was 47% by weight. Molecular weights of P portion, EP portion and the finally produced polymer were as follows: $[\eta]_P=1.17$, $[\eta]_{EP}=1.37$, $[\eta]_T=1.28$.

The properties of the granular thermoplastic elastomer obtained herein were as follows: MFR=22.1 (g/10 min.); complex dynamic viscosity $[\eta]^*(1)=5.1\times10^3$, $[\eta]^*(100)=2.0\times10^3$; Newtonian viscosity index n= 0.20. Evaluation of powder moldability revealed that the powder particles sufficiently fused mutually and the obtained molded sheet had a sufficiently high tensile strength. The tensile strength at break of the sheet was 84.0 kg/cm².

EXAMPLES 2–5

Block copolymerization of P-EP was carried out in the same manner as in Example 1 using the solid catalyst component synthesized in Example 1, except that the reaction conditions of the steps 1 and 2 were altered as shown in Table 1. The conditions and results of the reactions in the steps 1 and 2 are shown in Tables 1 and 2.

Comparative Example 1

Block copolymerization of P-EP was carried out in the same manner as in Example 1 using the solid catalyst component synthesized in Example 1, except that the reaction conditions of the steps 1 and 2 were altered as shown in Table 1. By this block copolymerization, a granular thermoplastic elastomer with desirable powder properties free from fine powder and coarse particles was obtained. However, since the polymer powder had as high a complex dynamic viscosity $\eta^*(1)$ as $3.3\times10^5$ poises, the powder particles did not fuse mutually and stayed on the die while retaining the original powder form. The conditions and results of the reactions of the steps 1 and 2 are summarized in Tables 1 and 2.

Comparative Example 2

(A) Synthesis of solid product

The inner atmosphere of a 500-ml flask equipped with a stirrer and a dropping funnel was replaced with argon gas. Thereto were charged 150 ml of n-heptane, 7.6 g (22.4 millimoles) of tetrabutoxytitanium and 78 g (378 millimoles) of tetraethoxysilane to prepare a uniform solution. Then, 200 ml (400 millimoles) of the organomagnesium compound synthesized in Example 1 (A) was slowly dropped into the flask from the dropping funnel while maintaining the inner temperature of the flask at 5° C. After the dropping, the resulting mixture was stirred at room temperature for an additional one hour and then separated into a solid phase and a liquid phase at room temperature. The solid phase was three times washed with each 300 ml portion of n-heptane and dried under reduced pressure to obtain 62.0 g of a brown colored solid product.

(B) Synthesis of solid catalyst component

After replacing the inner atmosphere of a flask having a capacity of 200 ml with argon gas, 15 g of the solid product synthesized in (A), 75 ml of toluene and 9.3 ml of diisobutyl phthalate were charged thereto and allowed to react at 95° C. for 30 minutes.

After the reaction, the reaction mixture was separated into a solid phase and a liquid phase, and the solid phase was twice washed with each 75 ml portion of toluene.

Then, 19.5 ml of toluene, 1.5 ml (8.9 millimoles) of n-butyl ether, 0.82 ml (3.0 millimoles) of diisobutyl phthalate and 30 ml (273 millimoles) of titanium tetrachloride were charged into the flask containing the washed solid phase, and allowed to react at 95° C. for 3 hours.

After the reaction, the reaction mixture was separated into solid and liquid phases and the solid phase was twice washed with each 75 ml portion of toluene.

The above-mentioned treatment was repeated once more using a mixtures of the washed solid phase, n-butyl ether, diisobutyl phthalate and titanium tetrachloride for a period of one hour. The product was twice washed with each 75 ml portion of n-hexane and dried under reduced pressure to obtain 13 g of an ocher-colored solid catalyst component.

The solid catalyst component obtained herein contained 1.9% by weight of titanium atom, 19.9% by weight of magnesium atom and 12.7% by weight of phthalic ester. The solid catalyst component had a mean particle diameter of 27 µm.

(C) Polymerization

Using 23.0 mg of the solid catalyst component prepared in (B), block copolymerization of P-EP was carried out in the same manner as in Example 1. The conditions and results of the reactions of steps 1 and 2 are summarized in Tables 1 and 2.

In this case, the resulting polymer had very bad particle characteristics because the solid catalyst component was not supported on a porous carrier. Thus, examination of the opened autoclave revealed that polymer particles adhered to the inner wall of autoclave to form layers and assumed a state of semi-solid. Evaluation of powder moldability revealed that the powder particles could not uniformly be sprinkled over the die due to coalescence of powder particles, so that only an imperfect sheet having many pin-holes was obtained.

EXAMPLE 6

(A) Synthesis of solid catalyst component

The inner atmosphere of a 3,000-ml flask equipped with a stirrer and a dropping funnel was replaced with argon gas. Then, 103 g of porous polymer beads constituted of styrene/divinylbenzene copolymer which had been vacuum dried at 100° C. for 6 hours was introduced into the flask together with 1,028 ml of toluene, 4,0 g (12 millimoles) of tetrabutoxytitanium and 38.0 g (183 millimoles) of tetraethoxysilane. Porosimeter measurement showed that the poros polymer beads had a dVp (volume of pores (ml/g) having a radius falling within the range of 200–2,000 Å) of 1.36 ml/g, Vp (volume of pores (ml/g) having a radius falling within the range of 35–75,000 Å) of 2.33 ml/g and a mean particle diameter of 40 μm. The resulting mixture was stirred at 30° C. for 45 minutes.

Then, 91.3 ml of the solution of the organomagnesium compound synthesized in Example 1 (A) was dropped from the dropping funnel over a period of 30 minutes, while maintaining the inner temperature of the flask at 5° C. After the dropping, the resulting mixture was stirred first at 5° C. for 55 minutes and thereafter at 30° C. for 45 minutes. Then, the stirred mixture was filtered, and the resulting solid material was three times washed with each 520 ml portion of toluene.

After the washing, 257 ml of toluene and 41.1 ml (154 millimoles) of diisobutyl phthalate were put into the flask containing the washed solid material and allowed to react at 95° C. for 30 minutes.

After the reaction, the reaction mixture was filtered at 95° C., and the solid material filtered off from the reaction mixture was twice washed with each 643 ml portion of toluene.

After the washing, 257 ml of toluene, 4.1 ml (24 millimoles) of n-butyl ether, 3.9 ml (15 millimoles) of diisobutyl phthalate and 514 ml (4.68 moles) of titanium tetrachloride were put into the flask containing the washed solid material and allowed to react at 95° C. for 3 hours. After the reaction, the reaction mixture was filtered at 95° C., and the solid material filtered off from the reaction mixture was twice washed with each 650 ml portion of toluene at the same temperature. Then, the above-mentioned treatment was repeated once more using a mixture of the solid material, n-butyl ether, diisobutyl phthalate and titanium tetrachloride for one hour. The product was twice washed with each 650 ml portion of n-hexane and dried under reduced pressure to obtain 122 g of a light brown colored solid catalyst component.

The solid catalyst component thus obtained contained 0.20% by weight of titanium atom, 2.32% by weight of phthalic ester, 0.04% by weight of ethoxy group and 0.09% by weight of butoxy group. The solid catalyst component had a mean particle diameter of 40 μm.

(B) Polymerization

<Pre-treatment of solid catalyst component>

Into a 3-liter SUS autoclave equipped with a stirrer were charged 1.2 liters of liquefied n-butane, 12 millimoles of triethylaluminum, 1.2 millimoles of cyclohexylethyldimethoxysilane and 60 g of a solid catalyst component. While maintaining the temperature of the autoclave at 10°–20° C., 300 g of propylene was fed and polymerized over a period of about 2.5 hours. After completing the feeding of propylene, the polymerization was continued for an additional one hour. Thereafter, n-butane was vaporized off. Thus, 360 g of a pretreated catalyst component was recovered.

<Propylene homopolymerization portion>

Into a gas phase fluidized bed polymerization reactor were continuously fed 50 millimoles/hr of triethylaluminum, 2.5 millimoles/hr of cyclohexylethyldimethoxysilane and 10 g/hr of the pre-treated solid catalyst component to carry out a continuous polymerization of propylene at a polymerization temperature of 80° C., at a polymerization pressure of 18 kg/cm$^2$ G, and at a hydrogen concentration in gas phase of 0.9% by volume. As the result, 7.0 kg/hr of propylene homopolymer was obtained. $[\eta]_P$ of the polymer was 1.27.

<Ethylene-propylene copolymerization portion>

Ten kilograms of the active polymer formed in the propylene homopolymerization step was transferred into a gas phase fluidized bed reactor having an inner diameter of 0.5 m, and batch-polymerized at a polymerization temperature of 70° C., at a polymerization pressure of 16 kg/cm$^2$ G, at an ethylene concentration in gas phase of 25% by volume and at a hydrogen concentration in gas phase of 10% by volume. When the formation of polymer in the polymerization reactor had reached 9 kg, the total polymer was drawn out of the reactor to obtain 19 kg of a granular thermoplastic elastomer powder excellent in fluidity. $[\eta]_T$ of the polymer thus recovered was 1.28; the content of ethylene in EP was 42.6% by weight; and the polymerization ratio between the propylene homopolymerization portion and the ethylene/propylene copolymerization portion was 52.7/42.3 by weight. It follows that $[\eta]_{EP}$ was 1.29.

The properties of this granular thermoplastic elastomer powder were as follows: MFR=21.1 (g/10 minutes); complex dynamic viscosity $\eta^*$ (1)=5 5×10$^3$, $\eta^*$ (100)=2.3×10$^3$; Newtonian viscosity index n= 0.19. Evaluation of the powder moldability revealed that the powder particles sufficiently fused mutually and the resulting molded sheet was sufficient in tensile strength. The sheet had a tensile strength at break of 112.5 kg/cm$^2$.

TABLE 1

| | Step 1 | | | | | | Step 2 | | | | |
|---|---|---|---|---|---|---|---|---|---|---|---|
| | Component (A) Solid catalyst component (mg) | Component (B) Triethyl-aluminum (g) | Component (C) Cyclohexyl-ethyldimeth-oxysilane (g) | Partial pressure of hydrogen (kg/cm$^2$G) | Temperature (°C.) | Time (min.) | Gas composition C$_2$'/C$_3$' ratio (by vol.) | Total pressure (kg/cm$^2$G) | Partial pressure of hydrogen (kg/cm$^2$G) | Temperature (°C.) | Time (min.) |
| Example 1 | 127.2 | 0.5 | 0.13 | 4.0 | 70 | 15 | 50/50 | 10 | 1.0 | 70 | 180 |
| Example 2 | 142.4 | 0.5 | 0.13 | 1.8 | 74 | 15 | 50/50 | 10 | 2.5 | 70 | 130 |
| Example 3 | 203.5 | 0.5 | 0.13 | 1.7 | 74 | 15 | 50/50 | 10 | 3.5 | 70 | 160 |
| Example 4 | 293.1 | 0.5 | 0.13 | 0.17 | 76 | 15 | 50/50 | 10 | 3.8 | 70 | 110 |
| Example 5 | 129.3 | 0.5 | 0.13 | 5.0 | 69 | 15 | 50/50 | 10 | 0.1 | 70 | 60 |
| Comparative Example 1 | 113.0 | 0.5 | 0.13 | 0.07 | 75 | 30 | 50/50 | 10 | 0 | 70 | 30 |
| Comparative Example 2 | 23.0 | 0.5 | 0.13 | 1.7 | 74 | 15 | 50/50 | 10 | 3.5 | 70 | 90 |

TABLE 2

| | Thermoplastic elastomer powder | | | | | | | |
|---|---|---|---|---|---|---|---|---|
| | Quantity of polymerization (g) | PP/Ti (g/g) | Step 1/Step 2 production ratio (by wt.) | Step 1 CXS (% by wt.) | $[\eta]_P$ | $[\eta]_{EP}$ | $[\eta]_T$ | Step 2 Ethylene content (% by wt.) |
| Example 1 | 195 | 638,000 | 46/54 | 1.2 | 1.17 | 1.37 | 1.28 | 47 |
| Example 2 | 193 | 567,000 | 48/52 | 1.2 | 1.40 | 1.17 | 1.28 | 44 |
| Example 3 | 188 | 388,000 | 54/46 | 1.2 | 1.48 | 1.00 | 1.26 | 41 |
| Example 4 | 170 | 242,000 | 60/40 | 1.2 | 3.23 | 0.96 | 2.32 | 41 |
| Example 5 | 188 | 604,000 | 52/48 | 1.4 | 0.99 | 2.28 | 1.61 | 49 |
| Comparative Example 1 | 165 | 608,000 | 34/66 | 1.2 | 4.68 | 4.23 | 4.38 | 41 |
| Comparative Example 2 | 215 | 492,000 | 55/45 | 1.1 | 1.45 | 0.99 | 1.24 | 45 |

| | Thermoplastic elastomer powder | | | | | Powder-molded sheet | |
|---|---|---|---|---|---|---|---|
| | MFR (g/10 min) | $\eta^*(1)$ (Poises) | $\eta^*(100)$ (Poises) | Newtonian viscosity index n | The state in autoclave | Powder-moldability | Tensile strength at break (kg/cm$^2$) |
| Example 1 | 22.1 | $5.1 \times 10^3$ | $2.0 \times 10^3$ | 0.20 | No adhesion of polymer observed | ++ | 84.0 |
| Example 2 | 26.7 | $4.1 \times 10^3$ | $1.7 \times 10^3$ | 0.20 | No adhesion of polymer observed | ++ | 70.0 |
| Example 3 | 42.2 | $3.5 \times 10^3$ | $1.2 \times 10^3$ | 0.24 | No adhesion of polymer observed | ++ | 80.6 |
| Example 4 | 10.8 | $9.5 \times 10^3$ | $2.3 \times 10^3$ | 0.31 | No adhesion of polymer observed | + | 36.6 |
| Example 5 | 11.0 | $9.3 \times 10^3$ | $2.9 \times 10^3$ | 0.28 | No adhesion of polymer observed | ++ | 67.9 |
| Comparative Example 1 | (*) | $3.3 \times 10^5$ | $2.3 \times 10^4$ | 0.58 | No adhesion of polymer observed | — | Unmeasurable |
| Comparative Example 2 | 44.0 | $3.4 \times 10^3$ | $1.1 \times 10^3$ | 0.25 | Adhesion of polymer observed | — | Unmeasurable |

(*)Under a testing load of 2.16 kg, MFR was unmeasurable because the polymer did not flow. A referential test using a testing load of 10 kg gave a result of 1.4 g/10 min.

EXAMPLE 7

(A) Synthesis of solid catalyst component

The inner atmosphere of a 200-l reaction vessel equipped with a stirrer was replaced with nitrogen gas. Then, 8.2 kg of porous polymer beads was charged in the vessel together with 41 l of toluene, 0.443 kg (1.30 moles) of tetrabutoxytitanium and 4.62 kg (22.2 moles) of tetraethoxysilane. The porous polymer beads were made of styrene-divinylbenzene copolymer and had been vacuum-dried at 100° C. for 6 hours. Porosimeter measurement showed that the copolymer had a dVp of 0.94 ml/g (dVp means the volume of pores (ml/g) having a radius falling within the range of 200–2,000 Å, hereinafter the same), a Vp of 1.48 ml/g (Vp means the volume of pores (ml/g) having a radius falling within the range of 35–75,000 Å, hereinafter the same) and a mean particle diameter of 38 μm. The resulting mixture was stirred at 30° C. for 2 hours.

Subsequently, 11.2 l of the solution of the organomagnesium compound synthesized in Example 1, (A) was dropwise added to the vessel over a period of an hour, while maintaining the inner temperature of the vessel at 5° C. After the dropping, the resulting mixture was stirred first at 5° C. for 30 minutes and thereafter at 35° C. for 3 hours. Then, the mixture was filtered, and the solid matter thus obtained was three times washed with each 58 l portion of toluene.

After the washing, 3.1 l (11.6 moles) of diisobutyl phthalate was put into the vessel containing the washed solid matter in a toluene slurry state, and allowed to react at 95° C. for 30 minutes.

After the reaction, a solid product was obtained. The solid product was collected by filtration at 95° C. and twice washed with each 58 l portion of toluene.

After the washing, 0.32 l (1.9 moles) of n-butyl ether, 0.29 l (1.1 moles) of diisobutyl phthalate and 39 l (356 moles) of titanium tetrachloride were put into the vessel containing the washed solid product in a toluene slurry state, and allowed to react at 95° C. for 3 hours. After the reaction, a solid matter was collected by filtration at 95° C. and twice washed with each 58 l portion of toluene. Then, the above-mentioned treatment was repeated once more using a mixture of the washed solid matter, n-butyl ether, diisobutyl phthalate and titanium tetrachloride over a period of one hour to obtain a solid. The solid was twice washed with each 58 l portion of n-hexane and dried under reduced pressure to obtain 11.5 kg of a light brown colored solid catalyst component.

The solid catalyst component thus obtained contained 0.51% by weight of titanium atom, 3.2% by weight of phthalic ester, 0.3% by weight of ethoxy group and 0.003% by weight of n-butoxy group. The solid catalyst component had a mean particle diameter of 38 μm.
(B) Polymerization
(a) Prepolymerization Into a stainless steel autoclave having an inner volume of 3 l and equipped with a stirrer were put 1.5 l of n-hexane, 37.5 millimoles of triethylaluminum (TEA), 11.25 millimoles of cyclohexylethyldimethoxysilane and 72 g of the above-mentioned solid catalyst component. All these reagents had been sufficiently dehydrated and deaerated beforehand. Prepolymerization was carried out by continuously feeding 36 g of propylene over an approximate period of 20 minutes, while maintaining the inner temperature of the autoclave at 15° C. or lower. The resulting prepolymer slurry was transferred to a stainless steel autoclave having an inner volume of 200 l and equipped with a stirrer. Then, 150 l of sufficiently purified liquid butane was added thereto and stored at 10° C. or lower.

(b) Polymerization in gas phase (i) First step

A random copolymerization of propylene and ethylene was continuously carried out at a polymerization temperature of 70° C. under a polymerization pressure of 18 kg/cm$^2$G by feeding 50 millimoles of triethylaluminum per hour, 5 millimoles of cyclohexylethyldimethoxylsilane per hour and 1.0 g of the prepolymer prepared as above in the form of a butane slurry per hour in a fluidized bed reactor having an inner volume of 1 m$^3$ and equipped with a stirrer, while feeding propylene, ethylene and hydrogen to the reactor so as to maintain the hydrogen concentration in gas phase at 0.15% by volume and the ethylene concentration in gas phase at 1.5% by volume, to obtain polymer powders. The average retention time calculated based on the amount of the polymer kept in the reactor and the formation rate of the polymer was 5.5 hours. Analysis of the thus obtained polymer revealed that the polymer had an intrinsic viscosity of 1.1.5 dl/g and an ethylene content of 2.7% by weight.

(ii) Second step

To a fluidized bed reactor having an inner volume of 1 m$^3$ and equipped with a stirrer were fed propylene, ethylene and hydrogen so as to set the hydrogen concentration in gas phase at 2.6% by volume and the ethylene concentration in gas phase at 20.5% by volume, and the temperature and pressure were set at 70° C. and 10 kg/cm$^2$ G, respectively. Thereafter, the polymer obtained in the first step was charged in the reactor. Then, a batchwise polymerization was continued for 12 hours at a polymerization temperature of 70° C. under a polymerization pressure of 10 kg/cm$^2$ G, while feeding propylene, ethylene and hydrogen to the reactor so as to maintain the hydrogen concentration in gas phase at 2.6% by volume and the ethylene concentration in gas phase at 20.5% by volume. After continuing the polymerization for 12 hours, the total polymer was taken out of the reactor and recovered to obtain a white powdery polymer in a yield of 44.8 kg. The polymerization ratio of the first step to the second step was 67/33. The white powdery polymer had an intrinsic viscosity of 1.46 dl/g and an ethylene content of 12.7% by weight. It contained 33% of an ethylene/propylene copolymer portion prepared in the second step (hereinafter EP portion). The content of ethylene in the EP portion was 33% by weight. The polypropylene homopolymer portion in the white powdery polymer (hereinafter P portion) and EP portion had $[\eta]_p$ of 1.15 dl/g and $[\eta]_{EP}$ of 2.1 dl/g, respectively. The white powdery polymer had a melt flow rate of 15.0 g/10 minutes, complex dynamic viscosities η* (1) of 2.0×10$^4$ poises and η* (100) of 3.2×10$^3$ poises, and a Newtonian viscosity index n of 0.40.

(C) Preparation of thermoplastic elastomer powder composition

A mixture of 100 parts by weight of the elastomer powder obtained above (2 kg) and 0.5 parts by weight of a releasing agent (B150 mfd. by Riken Vitamin, Co., Ltd., 10 g) was stirred with a Henschel mixer at 1,500 rpm at 100° C. for 10 minutes. Then, the temperature of the mixture was reduced to 60° C., while slowing the speed of revolution down to 500 rpm. Thereafter, 1.0 part by weight of a black pigment (PU801 mfd. by Sumika Color Co., Ltd.) was added thereto. Then, the resulting mixture was cooled to room temperature while stirring at 500 rpm to obtain a thermoplastic elastomer powder composition.

(D) Powder Molding

Figure 3:
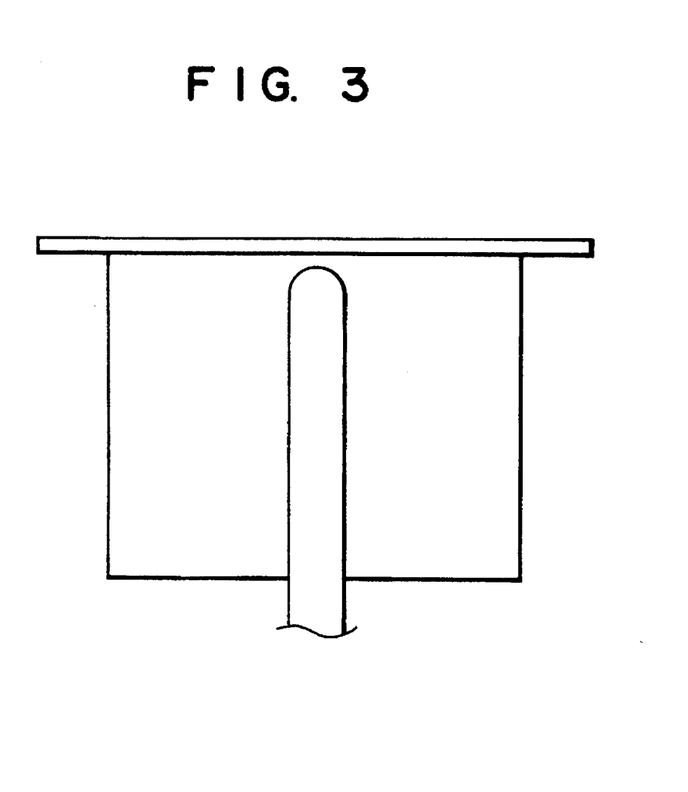
FIG. 3 is a side view of a powder supply box.

Two kilograms of the thermoplastic elastomer powder composition obtained above was charged in a box (powder supply box) made of stainless steel. As described in FIG. 1–3, the box had a rectangular parallelepiped shape with a width of 312 mm, a length of 252 mm and a depth of 210 mm. It had a rectangular opening 1 of 312 mm×252 mm at the top. It also had a driver 3 for rotating the box around a horizontal axis.

Figure 4:
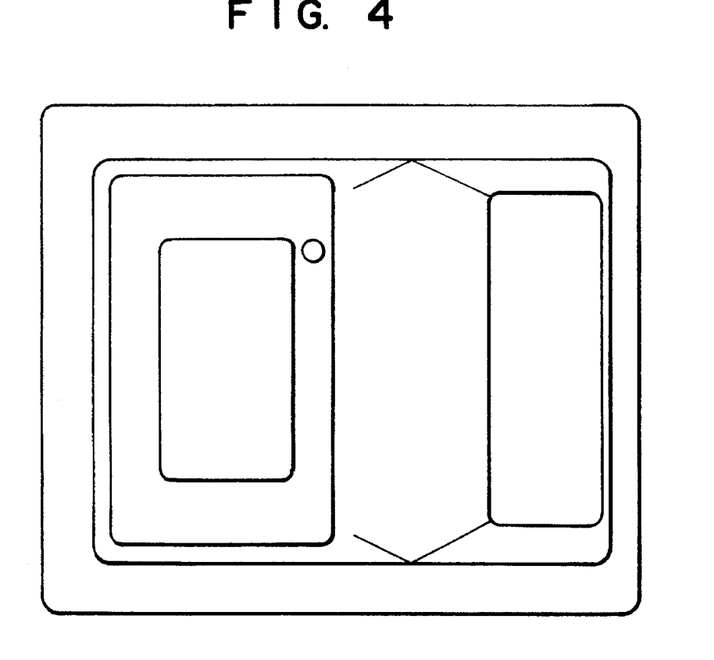
FIG. 4 is a plan view of a mold, which has a complicated grain pattern on its whole inner surface.
Figure 5:
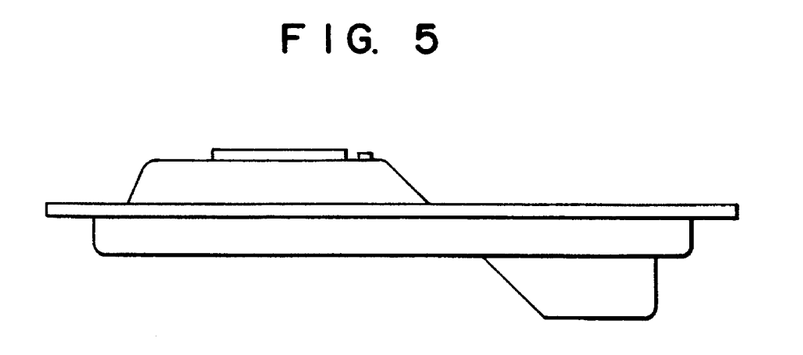
FIG. 5 is a front view of a mold.

On the other hand, a nickel electroformed mold was pre-heated in a gas furnace at 300° C. As described in FIG. 4–6, the mold had an opening 4 with the same shape and size as the opening 1 of the box described in FIG. 1. The mold had a wall thickness of 3 mm. It had a complicated grain pattern on the whole inner surface. When the surface temperature of the mold reached at 250° C., the thus heated mold was immediately put on the box so as to adjust the opening (312 mm×252 mm) of the mold to the opening 1 of the powder supply box. The frames around the openings of mold and box were tightly fitted, and fixed with clamps 2 so that the mold and box were united. Immediately thereafter, the united mold and box was rotated clockwise twice at a revolution speed of 30 rpm, and then anti-clockwise twice at a revolution speed of 30 rpm. Thereafter, the united mold and box was rocked ⅓ revolution once clockwise and ⅓ revolution once anti-clockwise so as to shake down excess powder adhered to the complicated-grain pattern.

After rotating and rocking motions, the united mold and box was made at rest at the position that the mold was put on the box. Then, the box and mold were separated. The mold was heated for a minute in a furnace at 280° C., cooled by water and the molded product was released from the mold.

The molded product had a weight of 80 g and a wall thickness of 0.9–1.1 mm. It reproduced the complicated grain pattern faithfully to the very details. It was very desirable in having uniform wall thickness and being free of defects and pin-holes.

1.92 Kilograms of the elastomer powder composition free of impurities was recovered in the box. Fresh elastomer powder composition was added to the recovered elastomer powder composition to make the total weight to 2 kg. Repeating the same procedure as described above by using the thus obtained composition also gave a molded product with a good appearance and uniform wall thickness.

As has been described above, this invention can provide a thermoplastic elastomer powder for use in powder molding process, produced by an inexpensive gas phase polymerization process, retaining a high fluidity even in a state where no substantial forming pressure is applied, free from pin-holes and the like, and capable of giving a molded product sufficiently high in the thermal fusion strength between powder particles; as well as a powder molding process using said elastomer powder; and a molded product of said process.

What is claimed is:

1. A powder molding process comprising the forming of a propylene based prepolymer by one method selected from the group consisting of:

a method comprising carrying out a polymerization in liquified propylene, a method comprising carrying out a polymerization in liquified propylene and thereafter carrying out a polymerization in gas phase, and a method comprising carrying out a polymerization in gas phase, to obtain a propylene-base prepolymer and thereafter carrying out a random copolymerization of ethylene and α-olefin to make an ethylene/α-olefin random copolymer portion in the presence of the propylene-based prepolymer in gas phase by the use of a catalyst system consisting of:

(A) a solid catalyst component comprising a porous carrier and a polymerization accelerator comprising titanium, magnesium and halogen supported on the porous carrier, (B) an organoaluminum compound, and (C) an electron donative compound, to form elastomer powder; the elastomer powder having a melt flow rate (MFR) of 15–200 g/10 min, an intrinsic viscosity $[\eta]_T$ of 1.25–1.70, a content of ethylene in the ethylene/α-olefin random copolymer portion of 20–85% by mole, and a complex dynamic viscosity $\eta^*$ (1) at a frequency of 1 radian/second of $1.5 \times 10^5$ poises or below as determined by dynamic viscoelastic measurement at 250° C., and having a Newtonian viscosity index n of 0.67 or below as calculated from the following equation:

ti $n = \{\log \eta^* (1) - \log \eta^* (100)\}/2$ wherein $\eta^*$ (1) is the complex dynamic viscosity at frequency of 1 radian/second and $\eta^*$ (100) is a complex dynamic viscosity at a frequency of 100 radians/second, and forming a molded article from said elastomer powder.

2. The powder molding process of claim 1, wherein the polymerization of propylene in liquefied propylene and/or gas phase is carried out in the presence of a small quantity of at least one member selected from the group consisting of ethylene and α-olefin having 4 or more carbon atoms.

3. The powder molding process of claim 1, wherein the random copolymerization of ethylene and α-olefin in the presence of the propylene-based prepolymer in gas phase is carried out in the presence of a small quantity of a diene.

4. The powder molding process of any one of claims 2, 3 or 1, wherein the porous carrier in the solid catalyst component (A) has a volume of pores having a radius falling within the range of 35–75,000 Å of 0.3 ml/g or more, a mean particle diameter of 5–200 μm, and a geometrical standard deviation of particle size distribution of 2 or less.

5. A powder molding process according to any one of claims 2, 3 or 1 which further comprises adding 0.2–20 parts by weight of a polyolefin resin powder as a coalescence preventer per 100 parts by weight of the thermoplastic elastomer powder.

6. A powder molding process according to any one of claims 2, 3 or 1 which further comprises adding 2 parts by weight or less of a methylpolysiloxane compound per 100 parts by weight of the thermoplastic elastomer powder.

7. The powder molding process of claim 6, wherein the methylpolysiloxane compound is a methylpolysiloxane compound having a viscosity of 20 centistokes or above at 25° C.

8. The powder molding process of claim 6, wherein the methylpolysiloxane compound is dimethylpolysiloxane.

9. The powder molding process of claims 2, 3 or 1, wherein the melt flow rate (MFR) is within the range of 20–150 g/10 min.

10. The powder molding process of claims 2, 3 or 1, wherein the content of ethylene in the ethylene/α-olefin random copolymer portion is 40–80% by mole.

11. The powder molding process of claims 2, 3 or 1, wherein the melt flow rate (MFR) is within the range of 25–120 g/10 minutes.

* * * * *